United States Patent Office 3,529,170
Patented Sept. 15, 1970

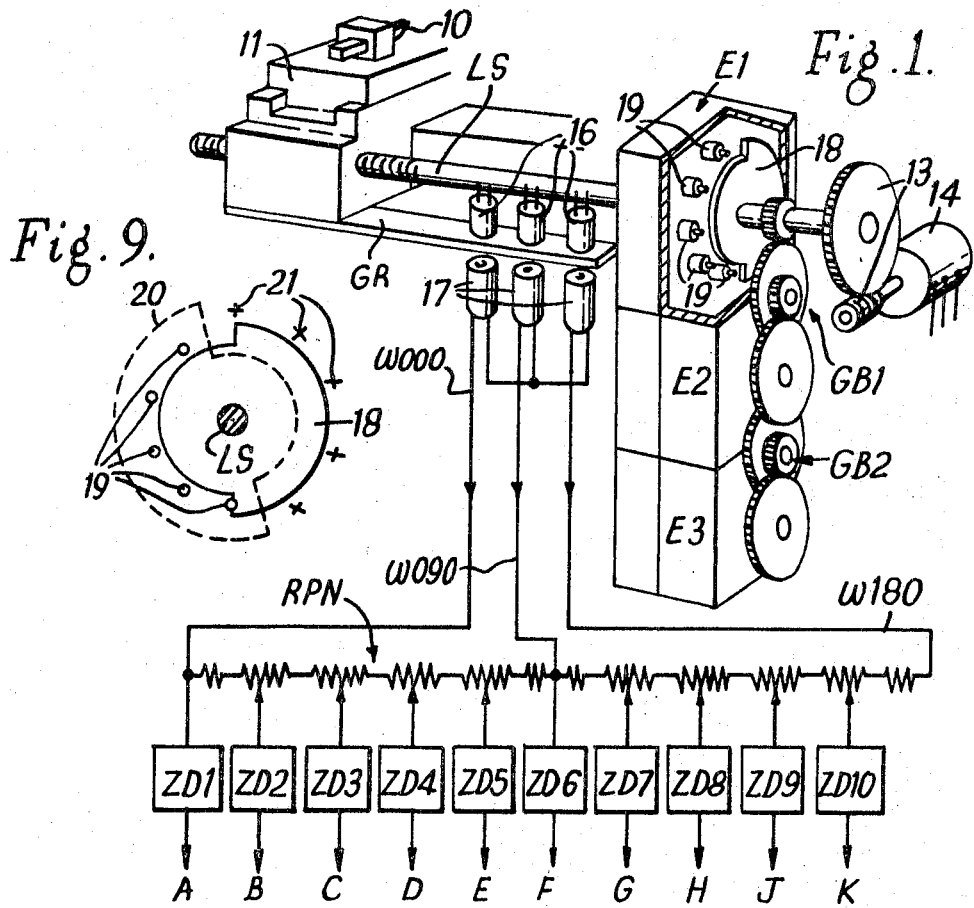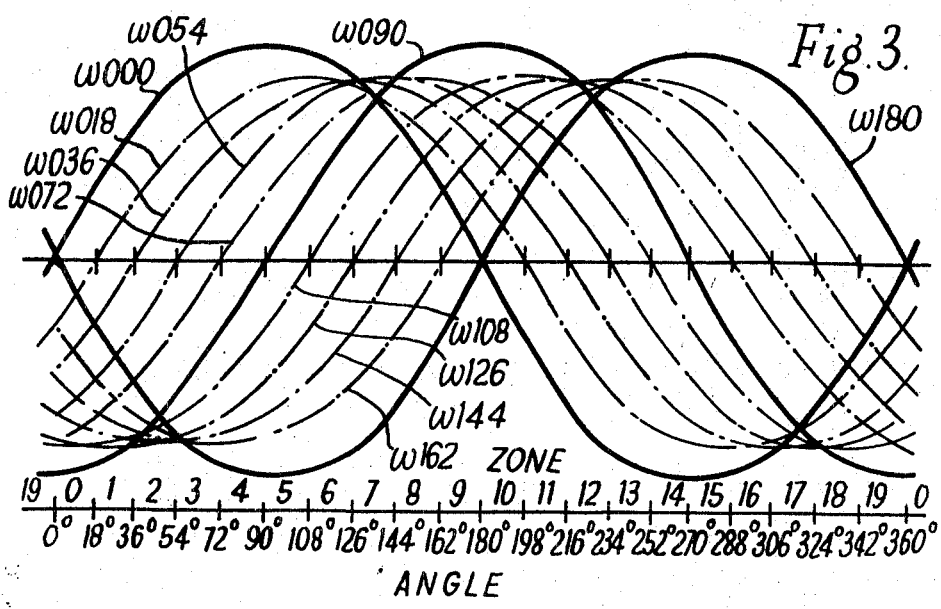

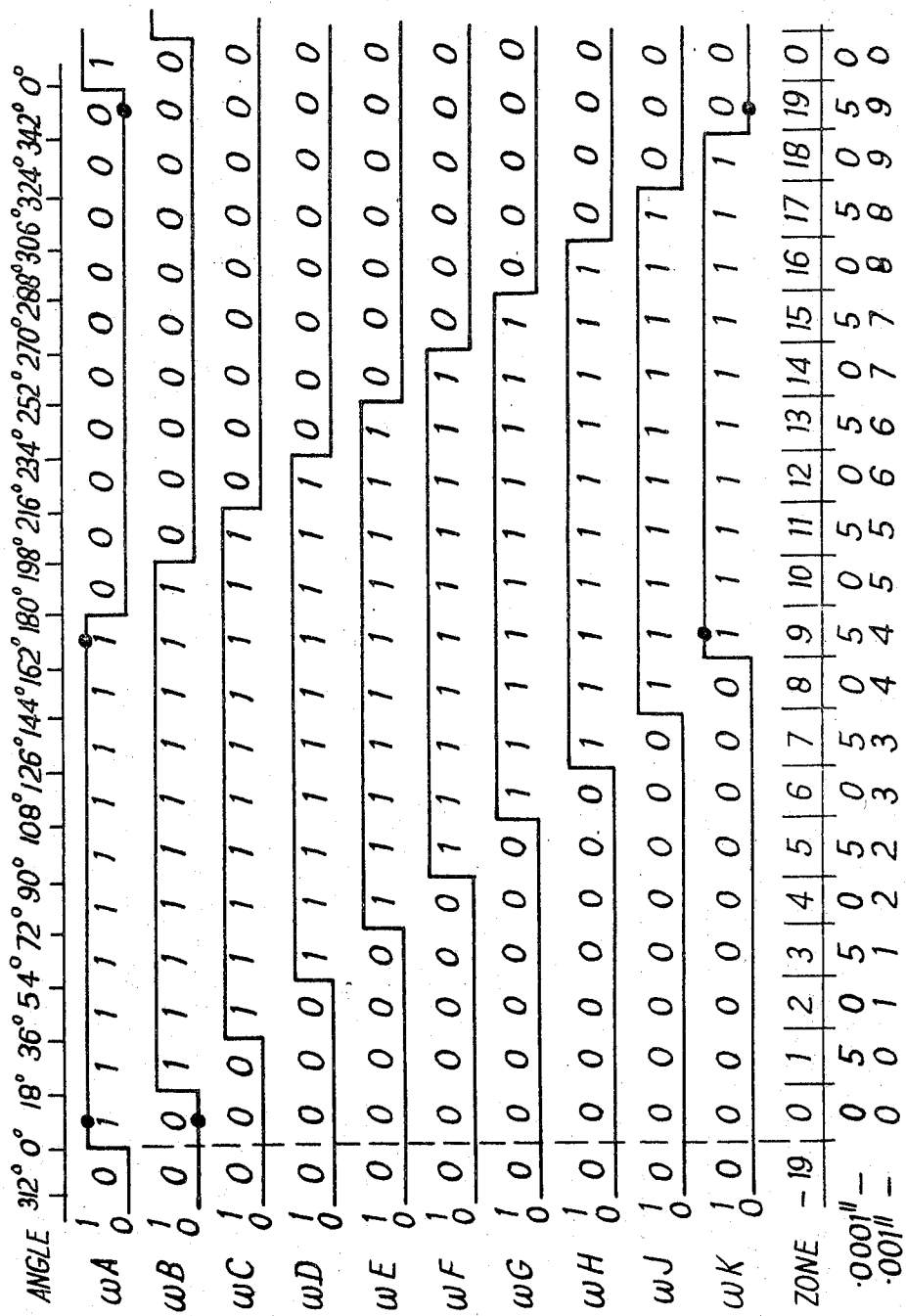

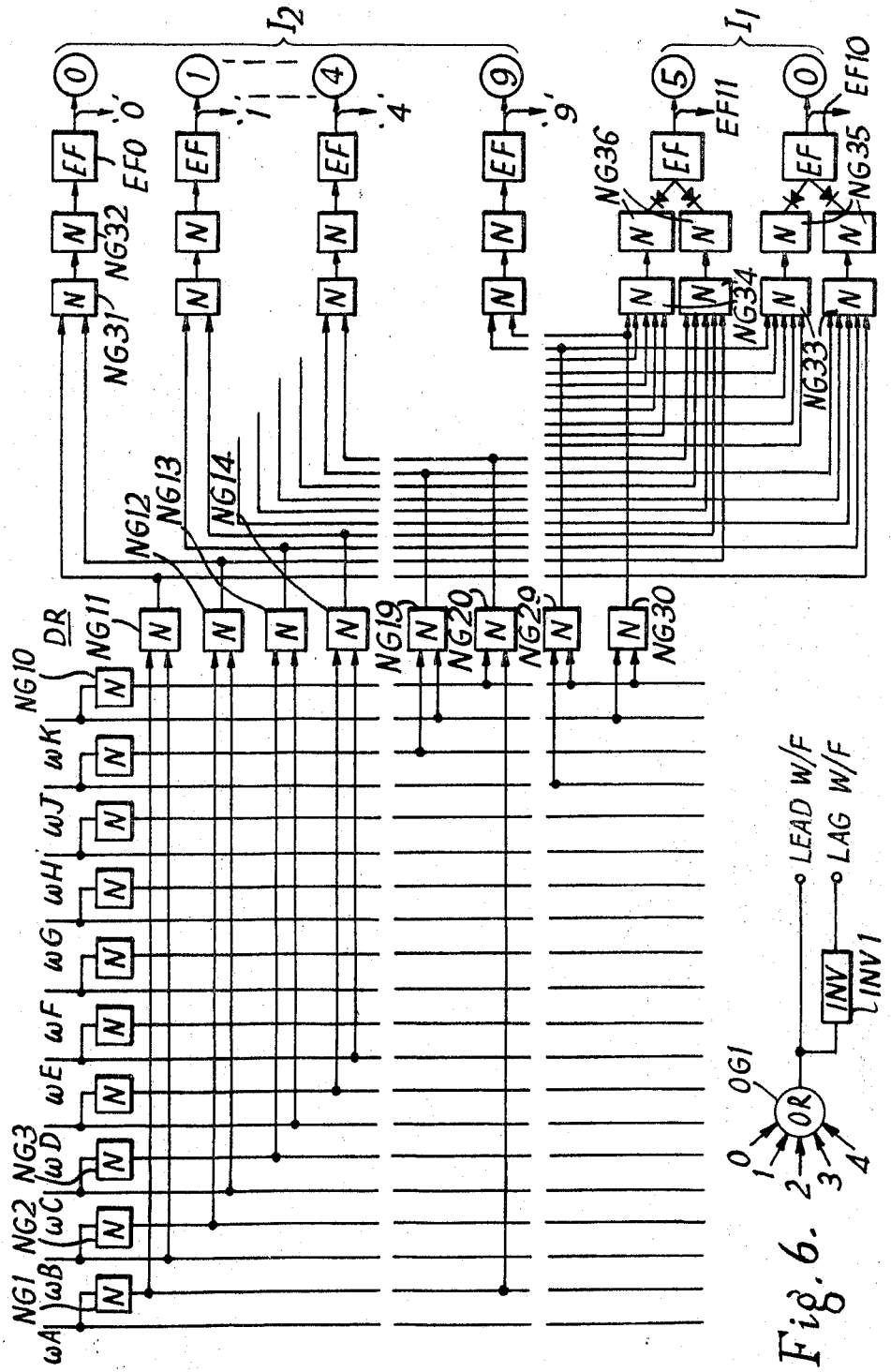

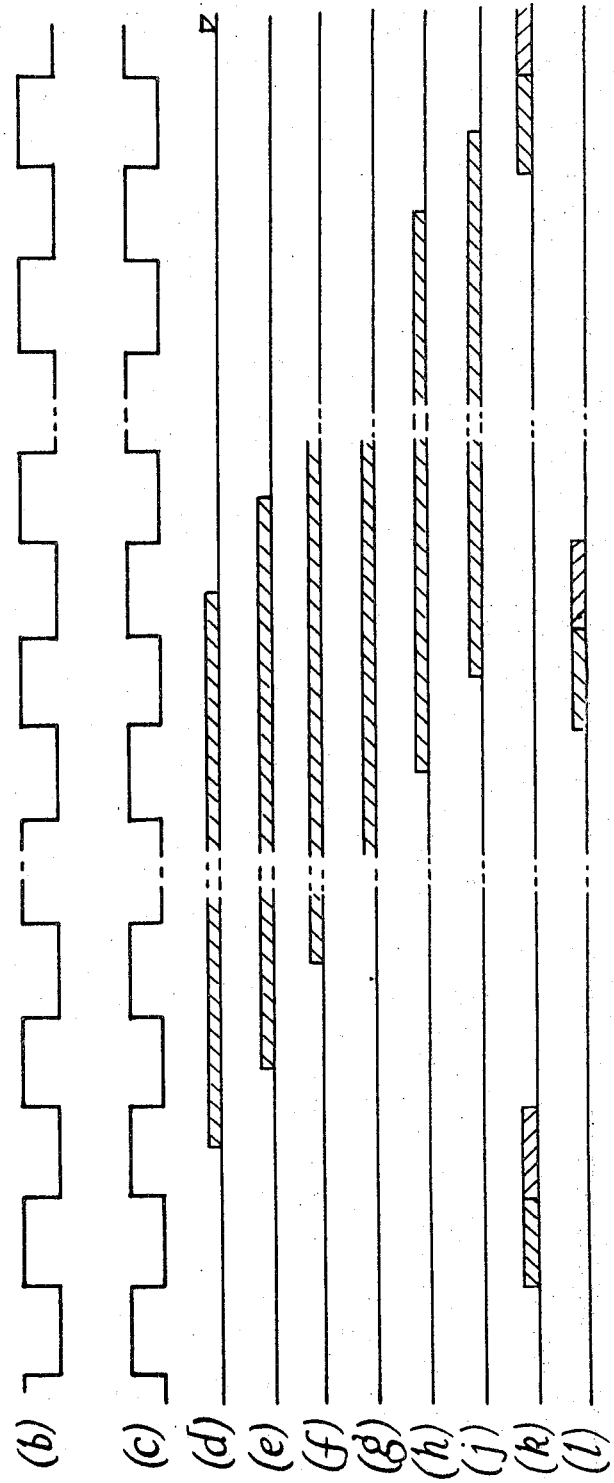

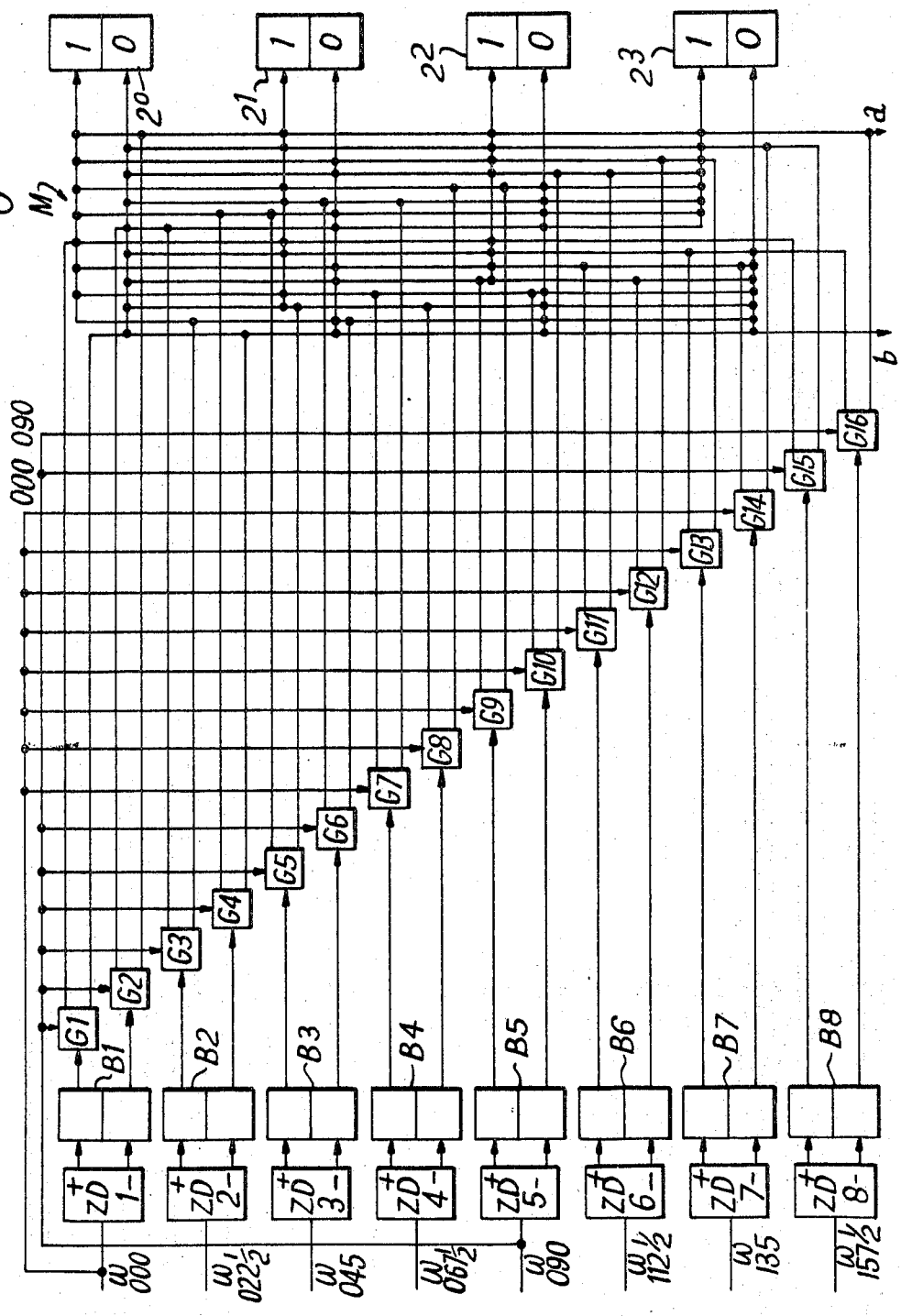

3,529,170
APPARATUS FOR SIGNALLING THE INSTANTANEOUS POSITION OF AN OBJECT MOVABLE ALONG A PREDETERMINED PATH
Alexander Russell, Glasgow, Scotland, assignor to National Research Development Corporation, London, England, a British corporation
Filed Aug. 5, 1966, Ser. No. 570,526
Claims priority, application Great Britain, Aug. 6, 1965, 33,831/65; Dec. 2, 1965, 51,257/65
Int. Cl. H01j 5/16, 39/12
U.S. Cl. 250—237       27 Claims

ABSTRACT OF THE DISCLOSURE

An arrangement for signalling the instantaneous position of an object, such as a machine tool, movable along a predetermined path and comprising encoder means coupled for operation by the object and including an optical grating and associated photoelectric reading means to develop a plurality of fluctuating signals of which each fluctuation cycle corresponds to movement of the object by a distance equal to one division of the grating and which are phase displaced relative to one another so that the instants of passage of the signals through a given datum level of amplitude, e.g. zero, corresponds to different displacement positions of the object equally spaced over the range of each grating division, a plurality of signal examining means supplied with said fluctuating signals and operative to detect the instants of passage of each signal through said datum level to develop a corresponding plurality of position code waveforms which have one level of amplitude when the object is on one side of the related displacement position and at another level of amplitude when on the opposite side of said displacement position, and logic circuit means for examining said code signals in different combinations to provide for energization of that one of a plurality of outputs which uniquely indicates the position of the object within any grating division. Additional encoder/decoder means of similar or electromechanical form operate similarly to provide further numerical indications in terms of multiples of the dimension of one division of the grating.

---

This invention relates to transducer arrangements for providing a numerical indication of the position of a movable object, such as a machine tool, and is more particularly concerned with means for combining the high accuracy obtainable from a conventional form of optical grating, which provides incremental information only, with the absolute displacement information available from a conventional form of mechanical or photoelectric type encoder.

A transducer arrangement in accordance with the present invention comprises an encoder including an optical grating and associated photoelectric reading means movable relatively to one another in dependence upon the movement of said object, means for deriving a plurality of cyclic alternating electric signals from said encoder, such signals being each of a form in which one alternation cycle corresponds to movement of the object by a distance corresponding to one division of the grating and being also so phase displaced relatively to one another that the instants of passage of the respective signals through a given datum level of amplitude correspond to different displacement positions of the movable object which are equi-spaced over the range of one division of such grating, means for separately detecting the instant when each of said signals passes through said datum level and the direction in which change is taking place, and a digital counter or store arranged to be controlled by said detecting and direction sensing means to register continuously the sub-division or zone of any grating division within which the object is located.

Preferably the cyclic alternating signals are of sinusoidal or substantially sinusoidal waveform and the datum level is the zero ordinate thereof. Conveniently a family of sinusoidal waveforms of appropriate phase-angle displacement are derived from a smaller number, e.g. three, waveforms which are derived directly from the photoelectric reading means associated with the optical grating. Counting and position registration may be effected in any chosen mode, such as in the binary mode when the counter or store may be constituted by a plurality of separate binary stages, but for many applications a decimal operating system may be preferable.

In order to facilitate combination of the above arrangements which serve to effect interpolation within each smallest or grating division, with information available from associated further encoder and decoder means which provide further positional information in terms of units which are multiples of said grating or unit division, use is preferably made in said further encoder means either of two alternative reading positions or of two separate encoder and decoder systems which are operationally displaced relative to one another to alter the number count thereof one before and the other after the instant of change of the smallest or grating division encoder means through each of its zero count positions.

In order that the nature of the invention may be more readily understood, one embodiment thereof will now be described in some detail and by way of illustrative example with reference to the accompanying drawings, in which:

FIG. 1 is a largely schematic illustration of a machine tool incorporating the invention;

FIG. 3 is a graphical diagram illustrating a family of alternating current signal waveforms as employed in the arangement of FIGS. 1 and 2;

Figure 2:
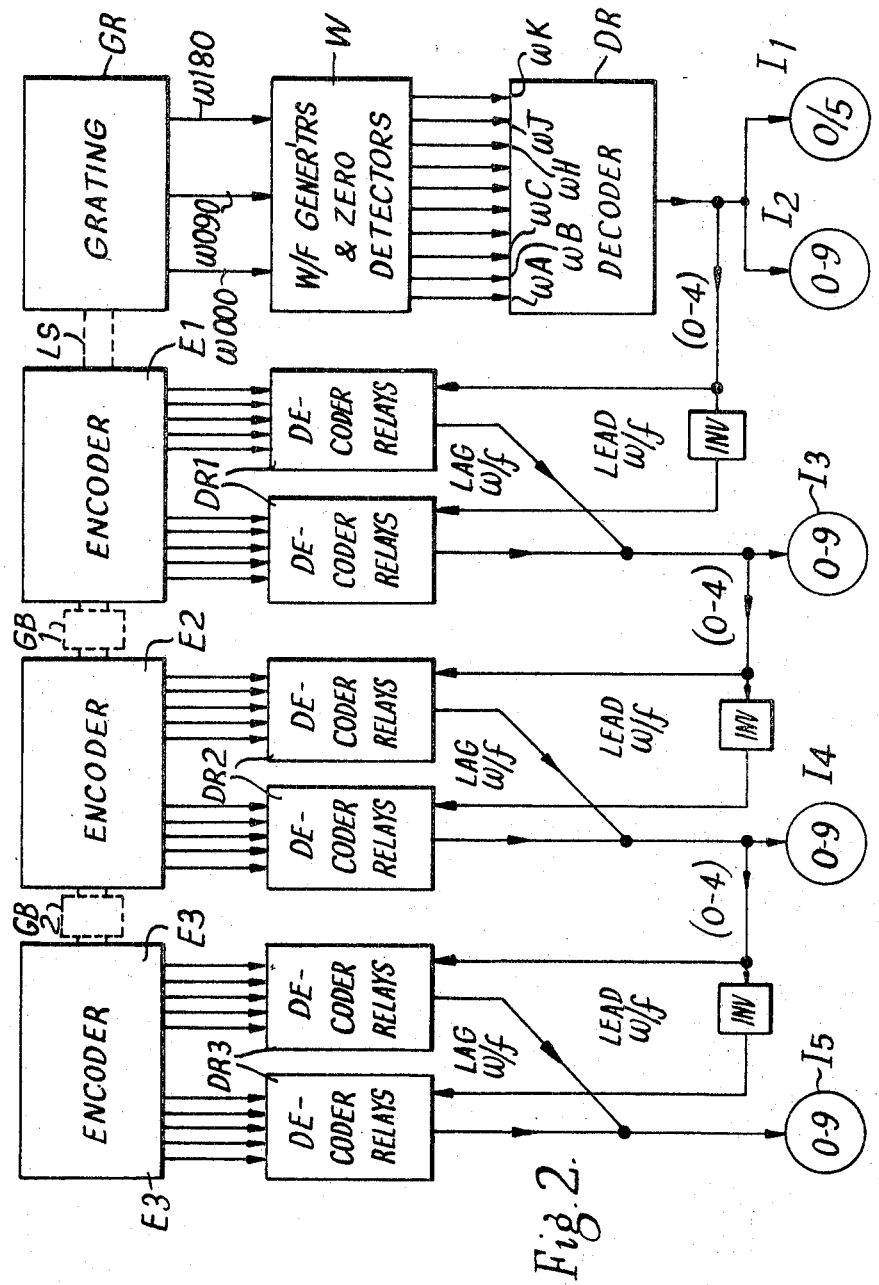
FIG. 2 is a block schematic diagram of the transducer arrangement of FIG. 1.
Figure 7:
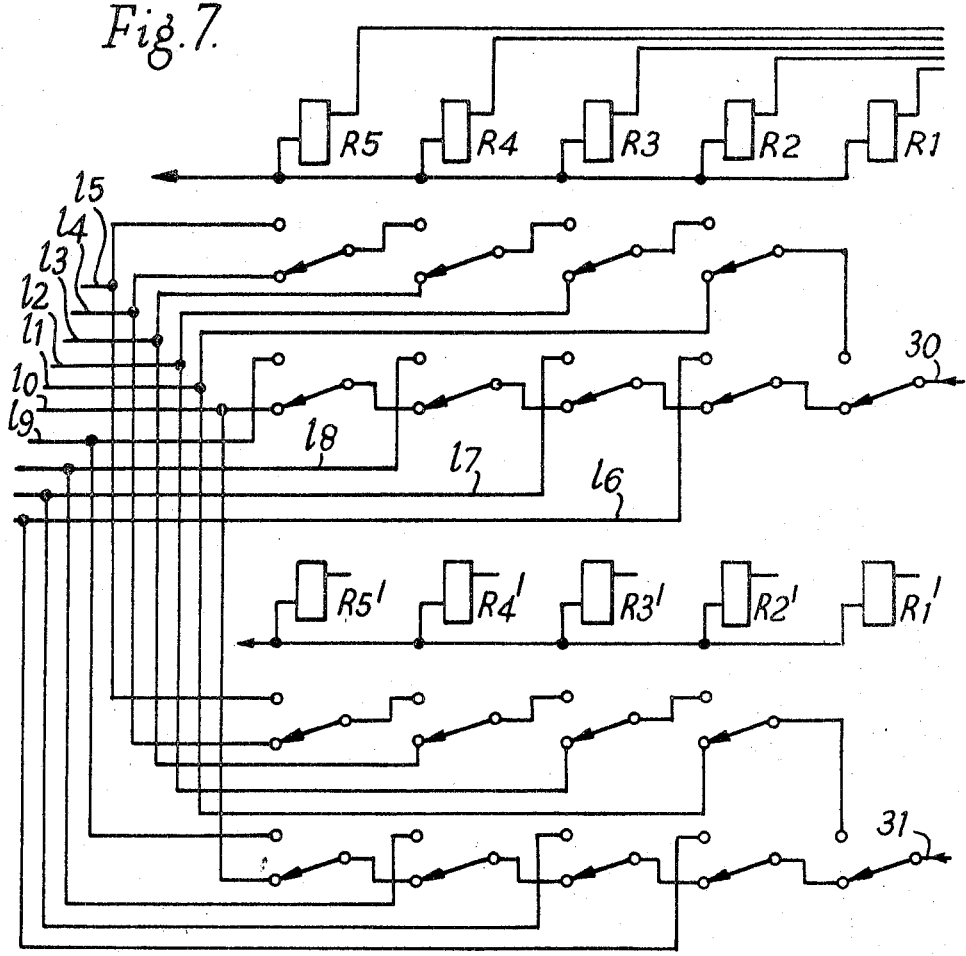

FIG. 4 comprises a series of waveform diagrams for illustrating the operation of the arrangement of FIG. 2;

FIG. 5 is a block schematic diagram illustrating the decoding arrangements for the least significant or grating section of the arrangement shown in FIG. 2;

FIG. 6 shows, in block schematic form, a waveform generator;

FIG. 7 is a circuit diagram illustrating one of the further decoder arrangements for the more significant digit sections of the arrangement shown in FIG. 2;

FIG. 8 comprises a further group of waveform diagrams related to the decoding arrangements of FIGS. 5, 6 and 7;

FIG. 9 is a fragmentary diagram of one of the mechanical encoders.

FIG. 10 is a block schematic diagram, similar to FIG. 5 of another arrangement operating on the binary mode.

Figure 11:
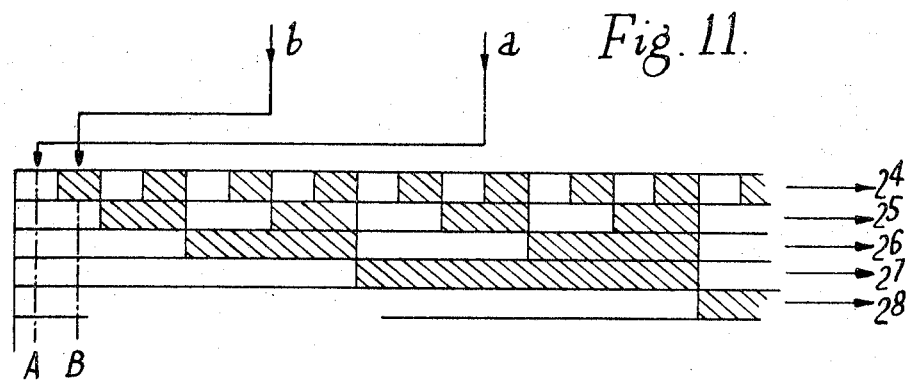
Figure 12:
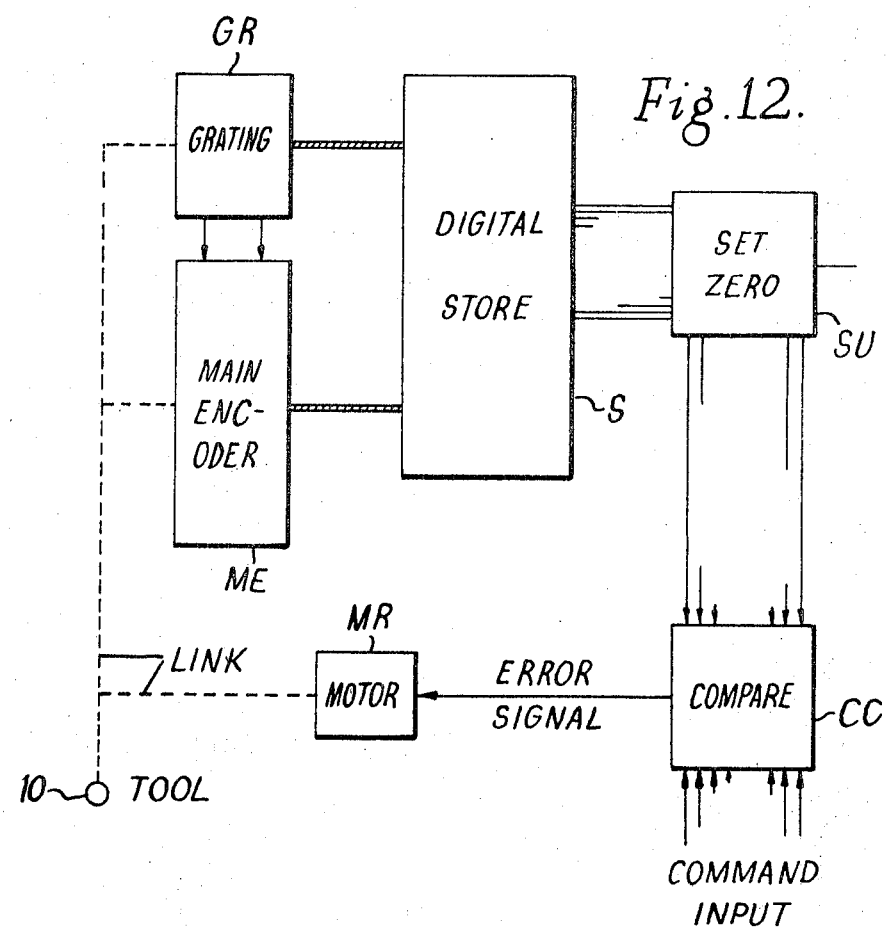

FIG. 11 is a diagram illustrating the alternative reading arrangements used in conjunction with a mechanical type transducer for the more significant binary digit sections of the arrangement of FIG. 10 while FIG. 12 is a block schematic diagram illustrating the application of arrangements according to the invention to the provision of a numerically controlled machine tool.

The embodiment about to be described in some detail is one in which the invention is applied to the control of the tool position along one axis of tool mvement in a numerically controlled machine tool, such as a lathe, and using decimal system numbers.

Referring first to FIG. 1, the tool 10 is mounted upon a slide block 11 and is movable in one linear direction by means of a lead screw LS which can be rotated either manually or by way of a gear train 13 from a suitable servo or other reversible electric motor 14. To the slide block 11 is attached a linear optical grating GR having, for example, a grating division dimension of 0.01 inch, i.e., 100 lines per inch. For co-operation with this grating GR there is provided three separate stationary light sources 16 disposed on one side of the grating and, on the opposite side, three photoelectric sensing heads 17, each provided with slotted masks and including phototransistor or like light sensitive means providing electric signal outputs. The three light sources 16 and photoelectric sensing heads 17 are so disposed relative to one another and the grating divisions that the respective primary signals are of sinusoidal waveform having an angular phase relationship of 000°, 090° and 180° to one another with one cycle of each wave corresponding to a movement of the grating GR and the tool 10 by one grating division, i.e. 1/100 inch.

Also coupled to the lead screw LS are three further encoders, E1, E2 and E3. The encoder E1 is shown as comprising, in one of two similar parts, a cam disc 18 rigidly secured to the lead screw and having an operative region extending over 180° of its circumference. Such operative region is effective upon the operating plungers of five single pole electric switches 19 which are spaced at 36° intervals around a 144° arc of the rotational path of the cam disc. As will be described in detail later, a second similar part comprising a second cam disc, as shown at 20 in FIG. 9 and also secured to the lead screw, is effective upon a second group of five switches 21. The encoder E2 is similar to the encoder E1 and is arranged to be driven from the lead screw LS through a 10:1 reduction gear GB1, while the further encoder E3 is again of similar form to the encoder E1 and is arranged to be driven from the spindle of the encoder E2 through a further 10:1 reduction gear GB2.

Referring now to FIG. 2, the three phase-displaced primary waveforms from the grating GR are applied to means W for generating a family of ten primary waveforms each 18° phase-displaced from its immediate neighbours. These ten waveforms are then applied to zero detector means to provide corresponding zero-detect or position code signals $wA$, $wB$ ... $wH$, $wJ$, $wK$ which are fed to a decoder DR to be described in greater detail later. This decoder DR operates to subdivide each output cycle of the basic grating waveform into 20 equal parts which, as the grating GR is arranged to provide one complete output cycle of waveform change for 1/100″ movement of the tool 10, each represent a displacement dimension of 0.0005″. Such displacements are displayed as positions indications on two indicators I1, I2. The first of these, I1, has two alternative displays "0" or "5" and indicates in 0.0001 inch dimension, the other I2, has ten different display indications "0"–"9" and indicates 0.001 inch dimensions.

The more significant encoder sections E1, E2, E3, comprising the groups of switches 19, 21 control the operation of relays in decoder sections DR1, DR2, DR3 respectively. The decoder output signals are then used to control the operation of further digital display indicators I3, I4 and I5. The indicator I3 indicates 0.01 inch dimensions, the indicator I4, 0.1 inch dimensions and the final, most significant, digit indicator I5, 1 inch dimensions.

Referring now to FIG. 3, in the means W there are derived from the above described three basic or primary waveforms as shown at $w000$, $w090$ and $w180$, eight further primary waveforms as shown at $w018$, $w036$, $w054$, $w072$, $w108$, $w126$, $w144$ and $w162$ to form a family in which the instants of passage of such waveforms through the zero datum level mark the positioning of the grating and hence of the tool 10 in different 18° sub-divisions of the 1/100 inch grating division. These additional waveforms may be derived as shown in FIG. 1 by applynig the three basic waveforms $w000$, $w090$ and $w180$ to a resistive potentiometer network RPN. By appropriate choice of the resistor values the various output waveforms available at the tapping points may have the desired phase relationship. For convenience and as shown the potentiometer network consists of a plurality of series-connected potentiometers with additional resistors to permit precise adjustment of the phase relationship of the different interpolation waveforms without disturbing the loading of the circuit as a whole.

The $w100$ and $w090$ waveforms and those available at network tapping points are applied to separate zero detect circuits ZD1 ... ZD10. These are conveniently low hysteresis Schmitt type trigger circuits which are arranged to be set to one state whenever the applied input voltage passes through the zero datum level in one direction and to be reset to the opposit state when the applied voltage again passes through zero in the opposite direction. The resultant output position code waveforms, $wA$, $wB$, $wC$, $wD$, $wE$, $wF$, $wG$, $wH$, $wJ$ and $wK$ are as shown in FIG. 4 from which it will be seen that the "on" period of each position code waveform extends over 180° of each complete division of the grating GR and the "off" period correspondingly extends over the remaining 180°.

The change-over instants of successive waveforms are phase displaced by 18° of the grating division cycle and in consequence each one of the twenty position zones 0–19 contained in one complete grating division is identifiable by a unique state combination of two zero detector outputs. Thus position zone 0 is uniquely identifiable by waveform $wA$ being "on" and waveform $wB$ being "off" or, in Boolean algebra form, as $A\overline{B}$, while zone 9 is identifiable as AK and zone 19 as $\overline{AK}$.

FIG. 5 illustrates, in fragmentary manner, the form of the decoder arrangements DR, FIG. 2. The respective zero-detect signals $wA$ ... $wK$ are each applied to a NOR gate NG1 ... NG10 used as an inverter to form the inverse or NOT version of each signal. The required different waveform combinations for identifying each zone 0–19 are respectively fed to further NOR gates NG11 ... NG30. The outputs from gates NG11 and NG12 are applied in combination to further NOR gate NG31 which feeds a further NOR gate NG32 operating as an inverter before an emitter follower EF0. The output of such emitter follower EF0 controls the operation of indicator lamp "0" of the ten lamp group I2 and is available as a staticised numerical indication signal "0." In addition the output of NOR gate NG11 is applied to one of a pair of further NOR gates NG33 which, through inverter NOR gates NG35, supply an emitter follower EF10 controlling the operation of indicator lamp "0" of the two-lamp indicator group I1. The output of NOR gate NG12 is likewise applied through NOR gates NG34 and NG36 and emitter follower EF11 to control lamp "5" of the same group I1.

The remaining NOR gates NG13 ... NG30 are similarly arranged; each successive pair controls the related one of the lamps of the indicator group I2 and one or the other of the lamps of the group I1, whereby each lamp of the ten lamp group I2 is illuminated in turn whilst the movable object is moving through two successive zones and one or the other of the further two-lamp I1 is illuminated according to which of such two zones contains the object.

Thus, if the movable object is in zone 8, FIG. 4, waveform $wJ$ will be "on" and waveform $wK$ will be "off." The NOR gate NG19 will be the only one of the group NG11–NG30 which is providing an output and as a result lamp "4" of group I2 and lamp "0" of group I1 will be illuminated to indicate the measurement position of 0.0040 inch. Upon movement of the object into zone 9, waveform $wK$ will come "on" and this, with waveform $wA$, also "on," will cause NOR gate NG20 alone to have an output which continues the illumination of lamp "4" of group I2 but reverses the illumination of group I1 to lamp "5" to indicate the new measurement position of 0.0045 inch.

The use of the arrangements above described avoids the need to employ pulse techniques for up-dating the indicator or store and results in the display being continuously linked to the input waveforms as the latter change.

The encoders E1, E2, E3 are of similar form and each comprise the two sets of five switches 19, 21 spaced 36° apart around an arc and arranged to be switched successively by rotary cams 18, 20 as already described. Referring now to FIG. 7 which shows the arrangement of a further part of the encoder E1, the set of five switches 19 control the respective energisation of relays R1, R2, R3, R4 and R5 in accordance with the following code in which "1" indicates energisation of a relay and "0" its de-energisation.

| R5 | R4 | R3 | R2 | R1 | Zone |
|----|----|----|----|----|------|
| 0  | 0  | 0  | 0  | 0  | = 0  |
| 0  | 0  | 0  | 0  | 1  | = 1  |
| 0  | 0  | 0  | 1  | 1  | = 2  |
| 0  | 0  | 1  | 1  | 1  | = 3  |
| 0  | 1  | 1  | 1  | 1  | = 4  |
| 1  | 1  | 1  | 1  | 1  | = 5  |
| 1  | 1  | 1  | 1  | 0  | = 6  |
| 1  | 1  | 1  | 0  | 0  | = 7  |
| 1  | 1  | 0  | 0  | 0  | = 8  |
| 1  | 0  | 0  | 0  | 0  | = 9  |

The other set of switches 21 control the other relays $R1^1$, $R2^1$, $R3^1$, $R4^1$ and $R5^1$ in similar manner. The related contacts of the relays R1 . . . R5 are arranged in circuit as shown, between a "lead" input conductor 30 and the lamp energisation leads $l_0$ . . . $l_9$ of the indicator lamp group I3. The contacts of the other relays R1' . . . R5' are similarly arranged between the same lamp group leads $l_0$ . . . $l_9$ and a "lag" input conductor 31. The "lead" or "lag" input conductors 30, 31 are energised alternately by control signals derived as shown in FIG. 6 by combining the five outputs "0," "1," "2," "3," and "4" from the emitter followers EF1 . . . EF5 of the grating decoder DR (FIG. 5) in an OR gate OG1, the direct output of which provides the "lead" waveform shown in FIG. 8(b) and, through an inverter INV1, the "lag" waveform shown in FIG. 8(c). The cams 18, 20 controlling the two groups of five contacts 19, 21 are so arranged on the lead screw LS that the various "lead" control relays R1–R5 are switched on and off substantially coincident with the mid point of the "off" periods of the lead waveform, i.e. at the time when the tool 10 is in one of the grating sub-divisions or zones of value "7" as may been seen from comparison of diagram (a), FIG. 8, with diagrams (d), (f) or (h), FIG. 8 which show the "on" periods of relays R1, R2 and R5 respectively.

The "lag" relays R1' . . . R5' are similarly switched approximately midway of the "off" periods of the "lag" waveform as indicated in FIG. 8(c), i.e. at the time when the tool 10 is in one of the grating zones value "2". See diagrams (e), (g) and (j) FIG. 8 which show the "on" periods of the R1', R2' and R5' relays.

The manner of operation of such encoder E1 is as follows. Assuming the tool 10 is in a position corresponding to indication "9" on indicator I2, indication "5" on indicator I1 and, say, "2" on indicator I3 and is moving to a position of greater digital significance, i.e. from zone "19" (FIG. 4) into the adjacent zone "0."

While the tool is in zone 19 of the grating or least significant encoder/decoder system, the "lag" waveform FIG. 8c) is "on" and the "lead" waveform (FIG. 8b) is "off." Referring to the relay operation code given above, relays R1', R2' will be energised and relays R3' . . . R5' will be de-energised. The "lag" waveform input at 31, FIG. 7, accordingly causes illumination of lamp "2" of group I3. Upon movement of the object from zone 19 into zone 0 of the grating or least significant digit encoder system, the "lag" waveform will go "off" and the lead waveform will come "on" at the precise instant of movement across the interzone division line. Before this instant however at the previous grating zone 7, the cam 18 controlling the switches 19 will have caused energisation of relays R1, R2, R3 and de-energisation of relays R4, R5 so that, immediately the "lead" waveform comes "on" at lead 30 (FIG. 7) lamp "3" is illuminated instead of lamp "2." The actual instants of change of the more significant indication of I3 are shown in FIG. 8, diagrams (k) and (l) and, as can be seen, are determined by the instants of change of the "lead" and "lag" waveform derived from the lower significant digit encoder/decoder system. Operation with movement of the object in the reverse direction is precisely similar. The remaining encoders and decoders E2, E3, DR2, DR3 are arranged and operate in like manner, the related "lead" and "lag" waveforms being provided from the indicator energisation circuits of the preceding stage of lower significance.

While the invention has been particularly described with relation to a multi-stage decimal system it will be apparent that any other form of numbering or size of division unit may be provided for such as a binary system. By the avoidance of pulse operation and the direct and continuous energisation of the indicator circuits, as in the embodiment just described, the indicators are continuously tied to the encoders and decoders and the system is freed from possible difficulty due to interference pulses or surges. The arrangements are suitable for use in the indication of movement in either a linear or a rotary direction.

FIG. 10, illustrates in block schematic form an alternative form of encoder/decoder for operation in the binary mode and in which eight output waveforms w000, w022½ . . . w135, w157½, similar to those shown in FIG. 3 but at 22½° intervals are each applied to a separate and related zero detector circuit ZD1, ZD2 . . . ZD8. Each of these zero detector circuits provides a positive-going output pulse at one output thereof when the applied waveform passes through zero with change in the sense of from negative to positive and a negative-going output pulse at a second output when the applied waveform passes through zero with change in the sense of from positive to negative. The respective two, + and —, outputs from each zero detector are employed as setting signals to opposite inputs of a related bistable circuit B1, B2 . . . B7, B8 whereby each of the said bistable circuits is re-set each time the related waveform passes through zero into a condition determined by the direction of change of the input waveform. The respective signals from opposite outputs of the series of bistable circuits, are applied as an input signal each to a separate and related signal controlled two-position switching device, G1, G2, G3 . . . G15, G16, each of said switching devices being controlled as to its switching position in accordance with the polarity of one or other of the basic w000 and w090 input waveforms from the grating so that, if such controlling input waveform is positive-going at any instant the switch will direct the signal from the related bistable circuit to one (the upper) output lead whereas when such control signal has the opposite polarity such signal will be directed to the alternative (lower) output lead.

The switching devices G1, G2 . . . G16 have their respective outputs connected appropriately to a binary encoding matrix M the outputs from which are connected to the different setting inputs of separate binary or two-state counter devices $2^0$, $2^1$, $2^2$ and $2^3$ forming a four stage digital store.

The operation of this arrangement will be understood by description of the following specific example. If the tool or other movable object has a position such that the w000 input waveform is crossing the zero ordinate and the direction of movement of the object is forwards to a position of greater digital significance, the input w000 waveform will be going positive so that the associated zero detector ZD1 will provide a positive pulse at its upper output to set the associated bistable circuit B1 to the state whereby an output signal is provided to the directional switch G1. This directional switch G1 is controlled by the $w090$ waveform which, at this time is negative-going (see FIG. 3) so that the signal is directed over the second (lower) of its two outputs to the matrix M which directs setting inputs to the "0" state inputs of each of the four digit storage devices $2^0, 2^1, 2^2, 2^3$, to provide the correct absolute position indication of 0000 since the tool has now moved into the first sub-division or zone 0 of the sixteen sub-divisions 0, 1 . . . 15 of one grating cycle provided in this embodiment. If, on the other hand, the tool had been moving backwardly, then although said $w000$ waveform would be passing through zero, the zero detector ZD1 would provide a negative-going pulse on the lower of its output leads to set the first bistable circuit B1 into the opposite state thereby energising its second output to apply a signal to the directional switch G2. Since the $w090$ waveform is still negative such switch would direct the output signal to its lower output lead so that energisation of the encoder matrix M causes setting pulses to be applied to the "1" input of each of the four digit stores $2^0, 2^1, 2^2, 2^3$. The setting configuration 1111 of the latter is accordingly correctly indicative that the tool is in the last zone 15 of the sixteen sub-divisions of one grating cycle.

The related, more significant digit sections of the associated main binary encoder need to be referred to for possible resetting only at those instants when the least significant four digital storage devices are set either to the configuration 0000 or 1111 so that the respective tracks of such main encoder can be so positioned relative to the grating that the related contact brush or optical scanning means are located at a position approximately midway along the length of any smallest length code section of the lowest significance track of such main encoder.

To provide correct setting of the more significant digit indicating stages associated with the main encoder, such encoder is provided with two sets of commutators or with an equivalent two reading or brush positions as shown schematically at A, B in FIG. 11. These are displaced from one another by a distance equal to movement over one cycle of the grating. Such alternative positions are then employed selectively in accordance with the provision of output signals from the encoder matrix M on leads $a$ or $b$ corresponding respectively with setting of the four (least significant) digit counter stages $2^0, 2^1, 2^2, 2^3$ to the 1111 and 0000 states.

A complete tool control system is shown in block schematic form in FIG. 12. The outputs from the grating GR and the further encoder sections ME each mechanically coupled to the movable tool 10 are fed into a digital store S whose respective sections are coupled to a set zero unit SU comprising a series of half-adders which zero any particular reading of the store on command in order to match the tool datum position to the transducer zero. Signals from the set zero unit SU are applied to one input of a comparison circuit CC whose opposite input is fed with command information in digital form representative of a required tool position thereby to develop an error signal for controlling energisation of the motor 14 for effecting movement of the tool 10 and coupled encoding members.

What is claimed is:

1. For use in apparatus for signalling the instantaneous position of an object movable along a predetermined path and including an optical grating and associated photoelectric reading means movable relatively to one another in dependence upon movement of said object, means comprising:

means operatively associated with said grating and said reading means for providing a plurality of simultaneous fluctuating electric position code signals each of a form in which each fluctuation cycle thereof is produced by movement of said object over a distance equal to one division of said grating and in which each such position code signal is at one amplitude level when said object is to one side of a predetermined sub-division point within any grating division and is changed abruptly to a different amplitude level when said object is moved to the opposite side of said sub-division point, said position code signals being so phase-displaced relatively to one another that their respective instants of abrupt change correspond to positioning of said object at different sub-division points within the range of each single division of said grating; and decoder means operatively associated with said providing means including signal examing means for examining each of a plurality of different combinations of said position code signals to detect a particular unique combination of position code signal values indicative of the positioning of said object between adjacent sub-division points within one grating division along said movement path.

2. Means according to claim 1 in which said means for providing a plurality of simultaneous fluctuating electric position code signals includes signal translating means for deriving from said photoelectric reading means a plurality of primary fluctuating electric signals each of a form in which each fluctuation cycle thereof is produced by movement of said object over a distance equal to one division of said grating and which are so phase-displaced relatively to one another that their respective instants of passage through a given datum level of amplitude correspond to positioning of said object at different ones of said subdivision points, and a plurality of second signal examining means each supplied with a different one of said primary fluctuating electric signals and operative to detect the instant of passage of the applied primary signal through said datum level and the directional sense in which change is taking place, said second signal examining means being each operative to provide a different one of said position code signals with the abrupt change instant thereof determined by detection of the instant of passage of the related primary signal through said datum level.

3. Means according to claim 2 in which each of said primary fluctuating signals is of a form which alternates in polarity about a zero value during movement of said object through one grating division.

4. Means according to claim 3 in which the amplitude datum level operative in said second signal examining means is the zero amplitude level of said primary alternating signals.

5. Means according to claim 4 in which said photoelectric reading means are operative to provide at least three alternating primary signals having phase-displaced relationship to one another and which comprises additional primary waveform generating means, said additional primary waveform generating means being supplied with said alternating output signals from said photoelectric reading means and being operative to generate additional alternating output signals having phase relationships interpolated between those of said output signals from said photoelectric reading means.

6. Means according to claim 5 in which said photoelectric reading means provide three alternating primary signals having a 0°, 90° and 180° phase relationship to each other each of said three alternating signals being produced by an independent photoelectric reading head of said photoelectric reading means.

7. Means according to claim 5 in which said additional waveform generating means comprise a resistive potentiometer network having spaced input tapping points connected to be supplied with signals from said reading heads and spaced output tapping points each providing a different one of said additional phase-displaced output signals.

8. Means according to claim 2 in which said second signal examining means each comprise a Schmitt type of electronic trigger circuit.

9. Means according to claim 1 in which said decoder means include logic circuit means comprising a plurality of coincidence gate circuit means each having two inputs connected to be supplied respectively with different position code signals.

10. Means according to claim 9 which includes a visual indicator comprising a plurality of separate digit display means and in which the outputs from said gate circuit means operate to control different ones of said digit displays.

11. For use in apparatus for signalling the instantaneous position of an object movable along a predetermined path and including an optical grating and associated photoelectric reading means movable relatively to one another in dependence upon movement of said object, means comprising:

means operatively associated with said grating and said reading means for providing a plurality of simultaneous fluctuating electric position code signals each of a form in which each fluctuation cycle thereof is produced by movement of said object over a distance equal to one division of said grating and in which each such position code signal is at one amplitude level when said object is to one side of a predetermined sub-division point within any grating division and is changed abruptly to a different amplitude level when said object is moved to the opposite side of said sub-division point, said position code signals being so phase-displaced relatively to one another that their respective instants of abrupt change correspond to positioning of said object at different sub-division points within the range of each single division of said grating;

decoder means operatively associated with said providing means including signal examining means for examining each of a plurality of different combinations of said position code signals to detect a particular unique combination of position code signal values indicative of the positioning of said object between adjacent sub-division points within one grating division along said movement path; and at least one encoder means and at least one additional de-coder means coupled to said movable object and operative to provide further signals indicating the position of the movable object in terms of multiples of the dimension of one division of said grating.

12. Means according to claim 11 in which said encoder means and said additional decoder means comprise two separate systems, one operative to change its count state before and the other operative to change its count state after the instant of passage of said movable object from one division of said grating to the next adjacent division of said grating and signal operated selection control means for determining which of said systems is to be made operative to provide a position indicating output signal, control signal generating means operated by signals derived from the encoder/decoder means of next lower digital significance to provide an operating signal for said selection control means operative to cause transfer of operation from one system to the other at each instance when said movable object passes from one grating division to the next.

13. Means according to claim 12 in which each system of said encoder means comprises cam means and a plurality of switches operated by said cam means coupled to said movable object.

14. Means according to claim 13 in which each system of said further decoder means comprises a plurality of relay devices each controlled by one of said cam-operated switches.

15. For use in apparatus for signalling the instantaneous position of an object movable along a predetermined path and including an optical grating and associated photoelectric reading means movable relatively to one another in dependence upon movement of said object means comprising:

means operatively associated with said grating and said reading means for providing a plurality of simultaneous fluctuating electric position code signals each of a form in which each fluctuation cycle thereof is produced by movement of said object over a distance equal to one division of said grating and in which each such position code signal is at one amplitude level when said object is to one side of a predetermined sub-division point within any grating division and is changed abruptly to a different amplitude level when said object is moved to the opposite side of said sub-division point said position code signals being so phase-displaced relative to one another that their respective instants of abrupt change correspond to positioning of said object at different sub-division points within the range of each single division of said grating;

decoder means operatively associated with said providing means including signal examining means for examining each of a plurality of different combinations of said position code signals to detect a particular unique combination of position code signal values indicative of the positioning of said object between adjacent sub-division points within one grating division along said movement path, said decoder means including logic circuit means comprising a plurality of coincidence grate circuit means each having two inputs connected to be supplied respectively with different position code signals;

a visual indicator comprising a plurality of separate digit display means and wherein the outputs from said gate circuit means operate to control different ones of said digit displays; and said visual indicator being operative to provide a decimal number indication.

16. For use in apparatus for signalling the instantaneous position of an object movable along a predetermined path and including an optical grating and associated photoelectric reading means movable relatively to one another in dependence upon movement of said object, means comprising:

means operatively associated with said grating and said reading means for providing a plurality of simultaneous fluctuating electric position code signals each of a form in which each fluctuation cycle thereof is produced by movement of said object over a distance equal to one division of said grating and in which each such position code signal is at one amplitude level when said object is to one side of a predetermined sub-division point within any grating division and is changed abruptly to a different amplitude level when said object is moved to the opposite side of said sub-division point, said position code signals being so phase-displaced relatively to one another that their respective instants of abrupt change correspond to positioning of said object at different sub-division points within the range of each single division of said grating;

decoder means operatively associated with said providing means including signal examining means for examining each of a plurality of different combinations of said position code signals to detect a particular unique combination of position code signal values indicative of the positioning of said object between adjacent sub-division points within one grating division along said movement path; and said decoder means providing a binary number indication of said object position.

17. For use in apparatus for signalling the instantaneous position of an object movable along a predetermined path and including an optical grating and associated photoelectric reading means movable relatively to one another in dependence upon movement of said object, means comprising:

means operatively associated with said grating and said reading means for providing a plurality of simultaneous fluctuating electric position code signals each of a form in which each fluctuation cycle thereof is produced by movement of said object over a distance equal to one division of said grating and in which each such position code signal is at one amplitude level when said object is to one side of a predetermined sub-division point within any grating division and is changed abruptly to a different amplitude level when said object is moved to the opposite side of said sub-division point, said position code signals being so phase-displaced relatively to one another that their respective instants of abrupt change correspond to positioning of said object at different sub-division points within the range of each single division of said grating;

decoder means operatively associated with said providing means including signal examining means for examining each of a plurality of different combinations of said position code signals to detect a particular unique combination of position code signal values indicative of the positioning of said object between adjacent sub-division points within one grating division along said movement path;

further encoder/decoder means coupled to said movable object and operative to provide further signals indicating the position of the movable object in terms of multiples of the dimension of one division of said grating, said further encoder/decoder means comprising a multi-track binary digital encoder device and an alternative reading means for each of said tracks, one of said reading means being located in advance of and the other of which reading means being located behind the position at which the changes of said encoder track coincidence with the instant of passage of said movable object from one division of said optical grating to the next.

18. Means according to claim 11 in which said means for providing a plurality of simultaneous fluctuating electric position code signals includes signal translating means for deriving from said photoelectric reading means a plurality of primary fluctuating electric signals each of a form in which each fluctuation cycle thereof is produced by movement of said object over a distance equal to one division of said grating and which are so phase-displaced relatively to one another that their respective instants of passage through a given datum level of amplitude correspond to positioning of said object at different ones of said sub-division points, and a plurality of second signal examining means each supplied with a different one of said primary fluctuating electric signals and operative to detect the instant of passage of the applied primary signal through said datum level and the directional sense in which change is taking place, said second signal examining means being each operative to provide a different one of said position code signals with the abrupt change instant thereof determined by detection of the instant of passage of the related primary signal through said datum level.

19. Means according to claim 18 in which each of said primary fluctuating signals is of a form which alternates in polarity about a zero value during movement of said object through one grating division.

20. Means according to claim 19 in which the amplitude datum level operative in said second signal examining means is the zero amplitude level of said primary alternating signals.

21. Means according to claim 20 in which said photoelectric reading means are operative to provide at least three alternating primary signals having phase-displaced relationship to one another and which comprises additional primary waveform generating means, said additional primary waveform generating means being supplied with said alternating output signals from said photoelectric reading means and being operative to generate additional alternating output signals having phase relationship interpolated between those of said output signals from said photoelectric reading means.

22. Means according to claim 21 in which said photoelectric reading means provide three alternating primary signals having a 0°, 90° and 180° phase relationship to each other each of said three alternating signals being produced by an independent photoelectric reading head of said photoelectric reading means.

23. Means according to claim 21 in which said additional waveform generating means comprise a resistive potentiometer network having spaced input tapping points connected to be supplied with signals from said reading heads and spaced output tapping points providing a different one of said additional phase-displaced output signals.

24. Means according to claim 18 in which said second signal examining means each comprise a Schmitt type of electronic trigger circuit.

25. Means according to claim 11 in which said decoder means include logic circuit means comprising a plurality of co-incidence gate circuit means each having two inputs connected to be supplied respectively with different position code signals.

26. Means according to claim 25 which includes a visual indicator comprising a plurality of separate digit display means and in which the outputs from said gate circuit means operate to control different ones of said digit displays.

27. Means according to claim 1 further including:
a predetermined number of separate output zone-defining channels operatively associated with said signal examining means for being selectively energized by an operated one of said signal examining means which has detected the particular unique combination of position code signal values indicative of the positioning of said object.

References Cited

UNITED STATES PATENTS

| | | |
|---|---|---|
| 3,014,134 | 12/1961 | Bower. |
| 3,076,374 | 2/1963 | De Neergaard ____ 250—233 X |
| 3,114,046 | 12/1963 | Cabaniss et al. |
| 3,278,929 | 10/1966 | Susor _____ 307—311 X |
| 3,285,123 | 11/1966 | Rantsch et al. |
| 3,303,347 | 2/1967 | Wingate _____ 250—220 |
| 3,351,768 | 11/1967 | Cooke. |
| 3,388,262 | 6/1968 | Stutz _____ 250—237 |

JAMES W. LAWRENCE, Primary Examiner

V. LAFRANCHI, Assistant Examiner

U.S. Cl. X.R.

250—220, 223; 356—167, 170